US009307320B2

(12) United States Patent
Rutledge et al.

(10) Patent No.: US 9,307,320 B2
(45) Date of Patent: Apr. 5, 2016

(54) FEEDBACK SUPPRESSION USING PHASE ENHANCED FREQUENCY ESTIMATION

(71) Applicant: HARMAN INTERNATIONAL INDUSTRIES, INC., Stamford, CT (US)

(72) Inventors: Glen A. Rutledge, Brentwood Bay (CA); Norm Campbell, Delta (CA); Peter R. Lupini, Victoria (CA); Christopher M. Belcher, Lehi, UT (US)

(73) Assignee: Harman International Industries, Inc., Stamford, CT (US)

( * ) Notice: Subject to any disclaimer, the term of this patent is extended or adjusted under 35 U.S.C. 154(b) by 36 days.

(21) Appl. No.: 14/339,995

(22) Filed: Jul. 24, 2014

(65) Prior Publication Data

US 2016/0029123 A1 Jan. 28, 2016

(51) Int. Cl.

*H04B 15/00* (2006.01)
*H04R 3/02* (2006.01)

(52) U.S. Cl.

CPC ........................................ *H04R 3/02* (2013.01)

(58) Field of Classification Search

CPC ........ H04R 3/02; H04R 25/453; H04R 27/00; H04M 9/082; G10L 2021/02082

See application file for complete search history.

(56) References Cited

U.S. PATENT DOCUMENTS

| | | | | |
|---|---|---|---|---|
| 6,347,148 | B1 * | 2/2002 | Brennan | H04R 25/453 381/312 |
| 6,505,091 | B1 * | 1/2003 | Imai | B23H 7/16 219/69.16 |
| 7,613,529 | B1 | 11/2009 | Williams | |
| 2006/0049981 | A1 * | 3/2006 | Merkel | G01S 7/288 342/195 |
| 2006/0227978 | A1 * | 10/2006 | Truong | H04N 9/082 381/66 |
| 2008/0085013 | A1 * | 4/2008 | Somasundaram | H03G 5/005 381/95 |
| 2010/0054496 | A1 | 3/2010 | Williams | |
| 2011/0240841 | A1 * | 10/2011 | Lange | H01J 49/0036 250/282 |
| 2013/0090868 | A1 * | 4/2013 | Kajiwara | G01M 5/0066 702/56 |
| 2014/0177868 | A1 * | 6/2014 | Jensen | H04R 3/002 381/94.7 |

OTHER PUBLICATIONS

Hainsworth et al., Time Frequency Reassignment: A Review and Analysis, Technical Report (27 pages), Cambridge University Engineering Dept., United Kingdom.

* cited by examiner

*Primary Examiner* — Simon Sing
(74) *Attorney, Agent, or Firm* — Brooks Kushman P.C.

(57) ABSTRACT

A feedback suppression system for reducing acoustic feedback may include a controller configured to buffer a series of incoming digital sample signals to provide a plurality of buffered signals, the incoming digital sample signal being indicative of an audio input signal that includes audio data and acoustic feedback, determine a complex spectrum of the plurality of buffered signals, determine a magnitude squared spectrum from the complex spectrum, identify at least one peak in the magnitude squared spectrum, identify a frequency of the at least one identified peak using a phase enhanced frequency estimate, and set a notch filter at the identified frequency to eliminate the acoustic feedback of the audio input signal.

20 Claims, 9 Drawing Sheets

FEEDBACK SUPPRESSION USING PHASE ENHANCED FREQUENCY ESTIMATION

TECHNICAL FIELD

Disclosed herein is a feedback suppression system using phase enhanced frequency estimation.

BACKGROUND

A microphone may receive an audio signal and transmit the same to an amplifier to amplify the received audio signals. Any number of loudspeakers may be used to playback the amplified audio signal. The amplified audio signal may often be subject to acoustic feedback due to a loop gain created from a closed loop established by the loudspeaker, the microphone and the amplifier.

Feedback suppression systems are often placed between the microphone and the amplifier to help mitigate the effects of feedback. These suppression systems may analyze an audio signal to detect feedback peaks.

SUMMARY

A feedback suppression system for reducing acoustic feedback may include a controller configured to buffer a series of incoming digital sample signals to provide a plurality of buffered signals, the incoming digital sample signal being indicative of an audio input signal that includes audio data and may include acoustic feedback, to determine a complex spectrum of the plurality of buffered signals, determine a magnitude squared spectrum from the complex spectrum; identify at least one peak in the magnitude squared spectrum, identify a frequency of the at least one identified peak using a phase enhanced frequency estimate, and set a notch filter at the identified frequency to eliminate the acoustic feedback of the audio input signal.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a frequency estimation system to be used with a feedback suppression system. The frequency estimation system estimates the frequencies at which feedback peaks occur. A notch filter is then placed at these frequencies to reduce the gain and thus reduce feedback. The estimated frequency may be determined using a phase spectrum of a Fast Fourier Transform (FFT) analysis of the audio signal in conjunction with the magnitude spectrum. The disclosed system provides for an improved frequency estimation system.

Figure 1:
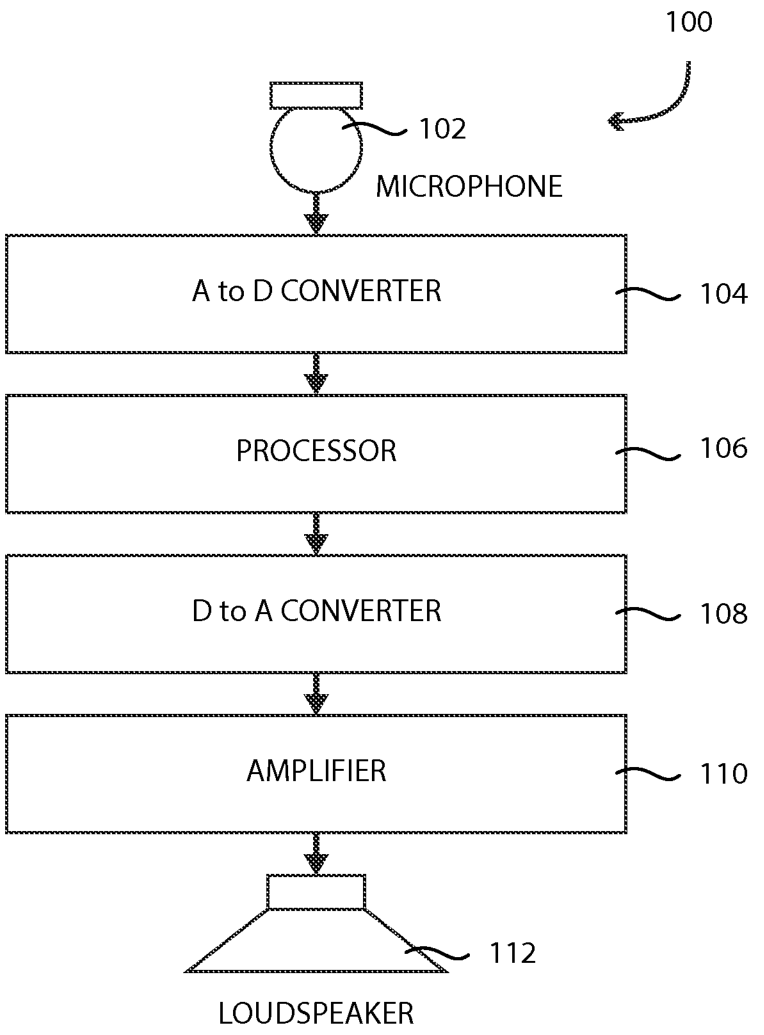
FIG. 1 is a block diagram of a sound system according to one embodiment.

FIG. 1 is a sound system 100 for suppressing feedback via phase enhanced frequency estimation. The system 100 includes at least one microphone 102, an analog-to-digital converter (ADC) 104, a processor 106, a digital-to-analog converter (DAC) 108 and an amplifier 110. The microphone 102 receives an audio input and may generate electrical signals indicative of the audio input based on sounds produced nearby. The ADC 104 may sample the electrical signals from the microphone 102 at a given rate (e.g., every 21 microseconds). The ADC 104 may convert the sampled signals from the microphone 102 into digital samples. The processor 106 receives the digital samples and processes the same to remove any feedback from the digital samples. For example, the processor 106 may include a notch filter that may reject or attenuate a frequency band between a lower frequency band and a higher frequency band. The processor 106 may then transmit the processed samples to the DAC 108, which in turn may create analog electrical signals. The analog electrical signals are then sent to the amplifier 110 which drives the loudspeaker 112 to create acoustic signals that are free of feedback.

The processor 106 may be a hardware based computing device or may be within a computing device. The processor 106 may include a controller including computer-executable instructions, where the instructions may be executable by one or more computing devices.

Figure 2A:
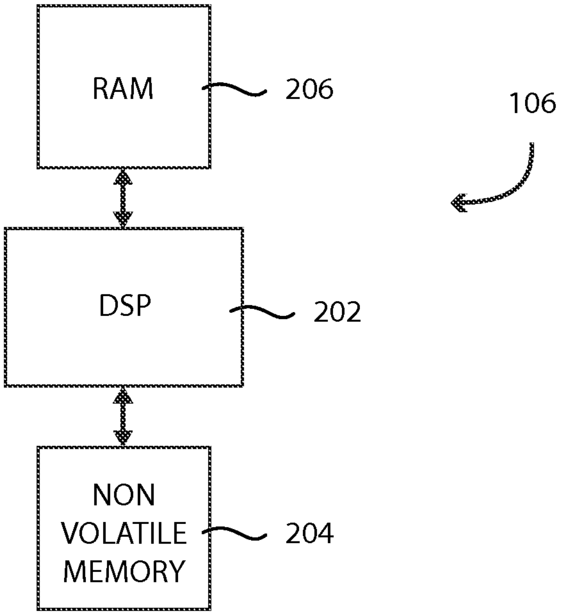
FIGS. 2*a* and 2*b* are block diagrams of a digital processor of FIG. 1.
Figure 2B:
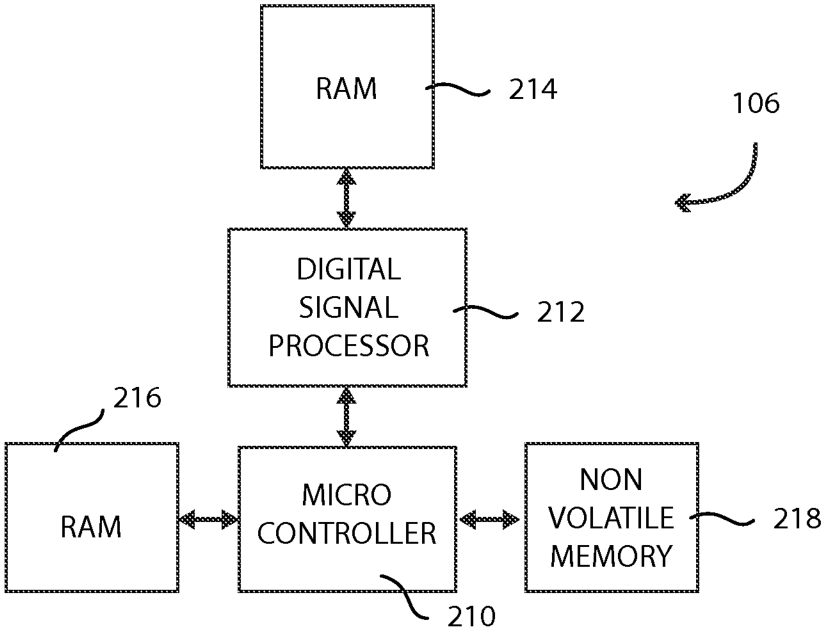

FIGS. 2*a* and 2*b* are block diagrams of the processor 106 of FIG. 1. In the example shown in FIG. 2*a*, the processor 106 may include a digital signal processor (DSP) 202, a non-volatile memory 204 for storing program instructions and a random access memory (RAM) 206 for storing digital samples received from the ADC 104. In the example shown in FIG. 2*b*, the processor 106 may include, or be in communication with, a separate microprocessor, for example, a loudspeaker controller 210. In this example, the processor 106 may include a DSP 212 having its own RAM 214 and the controller 210. Such an arrangement allows for sharing of resources and functions. The controller 210 may be coupled to another RAM 216 and a non-volatile memory 218.

The RAMs 206, 214, 216 may be memory devices to store data items capable and enable such data items to be read therefrom. The RAMs 206, 214, 216 may include circular buffers. The non-volatile memories 204, 218 may store program instructions and may be in the form of flash memory or read only memory (ROM). The program instructions may be loaded during a start-up process in the appropriate RAM 206, 214, 216.

Figure 3:
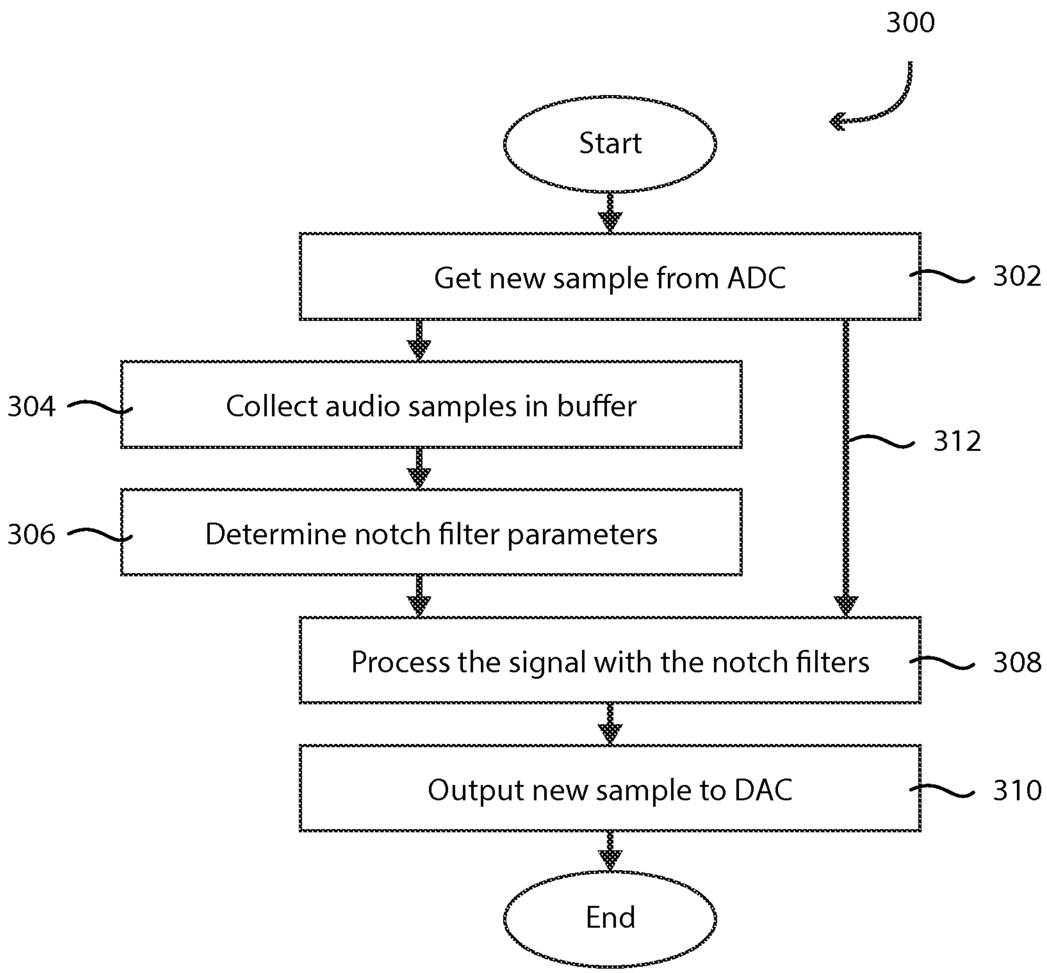
FIG. 3 is a process flow diagram illustrating the signal processing performed by the processor.

FIG. 3 is a process 300 illustrating the manner in which the processor 106 processes signals according to one embodiment. At block 302, the processor 106 may receive a new digital sample from the ADC 104. As explained, each signal may be received every approximately 21 microseconds from the ADC 104 and the microphone 102. A simple optimization may be performed wherein the samples are buffered from the ADC 104 at up into 32 sample or 64 sample frames at this stage. This optimization may be performed to increase efficiency. Once the digital sample is received, the process 300 proceeds to block 304.

At block 304, the processor 106 stores the digital samples in a buffer in RAM 206.

At block 306, the processor 106 may analyze the digital samples and determine notch filter parameters such as frequency, bandwidth or alternatively Quality factor, which is inversely related to the bandwidth (i.e., Q-value), and gain. This process may be performed at intervals, such as every 85 milliseconds.

At block 308, the processor 106 may apply at least one notch filter to the samples using the determined notch filter parameters. The samples are processed in the time domain using the filter parameters determined in block 306. While the samples may be processed at one processing rate, the notch filter parameters may be defined at a different processing rate (typically a much slower rate) at block 306, as indicated by the line 312. Advantages exist in running block 306 at a slower rate than the filtering block 308 since block 306 is computationally complex. When the notch filter parameters are changed in block 306, the filter parameters used in block 308 are slowly changed (i.e., interpolated) from their current values to the new target values defined by block 306 over a time of approximately 50-200 ms to avoid introducing clicks in the audio. The interpolation can be done on the filter parameters, on the actual computed filter coefficients, or on a combination of both.

At block 310, once the notch filter has been applied, the processed samples are sent to the DAC 108. The process 300 then ends.

Figure 4:
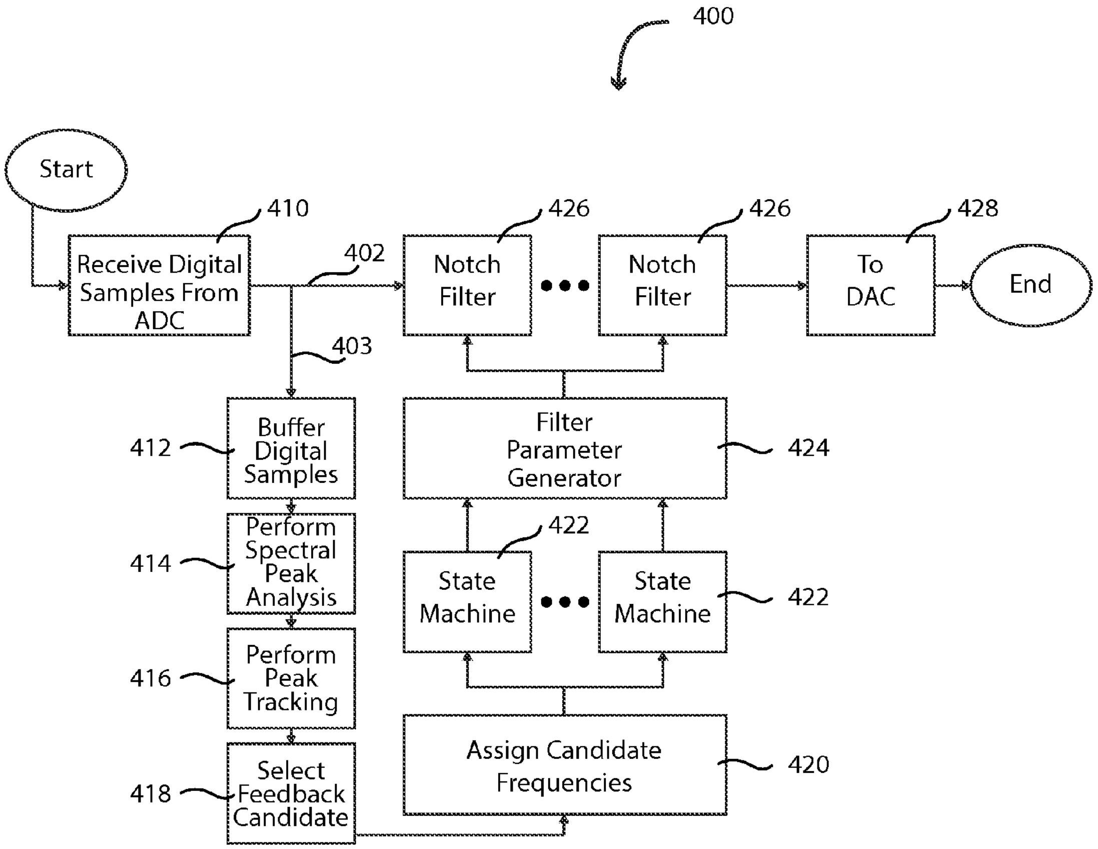
FIG. 4 is a process flow diagram for analyzing and processing digital samples within the processor.

FIG. 4 is a process 400 for analyzing and processing the digital samples at the processor 106. The process 400 may include analyzing the digital samples and determining the various notch filter parameters along path 403 (e.g., block 306 in FIG. 3). The process 400 may process the digital samples by applying at least one notch filter using the determined notch filter parameters along path 402 (e.g., block 308 in FIG. 3).

At block 410, the processor 106 may receive the digital samples from the ADC.

At block 412, along path 403, the processor 106 may transmit the stored copies of the digital signals to a buffer (in RAM 206). The notch filter parameters determined along path 403, may be determined at one rate while the digitals samples may be processed along path 402 at a different rate. That is, the stored copies of the digital signals may be used to generate the notch filter parameters at a different rate than the rate at which the digital signals are processed. In one example, the notch filter parameters may be determined at a rate of once every 85 milliseconds while the digital signals may be processed at a rate of once every 21 microseconds.

At block 414, the processor 106 may perform a spectral analysis of the buffered signals to isolate peaks in the magnitude spectrum. During this process, frequency estimates as well as other spectral features such as the average spectral level may be used to isolate the peaks. This process is described in more detail with respect to FIGS. 5 and 6 below.

At block 416, the processor 106 may perform a spectral peak analysis to identify a peak trajectory based on a tracking of the peaks over a time period. Several peak features may be extracted from the peak trajectory, such as the rate of growth of the peak magnitudes, the standard deviations of the peak magnitudes, the rate of change of the peak frequencies, and the standard deviations of the peak frequencies. Other measures of deviation could also be used here such as maximum absolute deviation.

At block 418, the processor 106 may use the extracted features for each peak trajectory to classify each peak as either a feedback peak or a program material peak. The classifier can be based on simple thresholds for each of the extracted features or it can use more advanced techniques such as a Bayesian classifier or a neural network. The parameters of the classifier may either be tuned by hand or they may be estimated by using a training set of peaks that are pre-classified as feedback peaks or program material peaks. The deviation in frequency of the classified peak is a useful feature when the frequency is estimated using fast frequency reassignment. This may be due, at least in part, to the very small measurement error associated with fast frequency reassignment (see, e.g., equation 14 below) that allows the natural deviation of the peaks to be accurately estimated. Feedback peaks tend to have very small deviation where most program material peaks from voices or instruments tend to have significantly larger deviation. Thus the deviation in the reassigned frequency of the peak trajectories is a powerful discriminant for classifying peaks as either program material or feedback. For example, the deviation in frequency can be computed as:

$$dF(k_{peak}) = \frac{1}{N}\sum_{k=0}^{N-1} \text{abs}(F(k_{peak}, k) - F(\widehat{k_{peak}})) \quad \text{Eq. 1}$$

where $k_{peak}$ is the index of the kth peak, $F(k_{peak}, k)$ is the reassigned frequency of the $k^{th}$ peak at a delay of k measurement intervals, and $F((\widehat{k_{peak}}))$ is the mean value of the reassigned frequency over the past N measurement intervals. The absolute value is taken of the difference of $F(k_{peak}, k)$−$F((\widehat{k_{peak}}).)$. A measurement interval k may refer to each time the reassigned frequency is computed for a peak (typically every 85 ms). Most feedback peaks will have a $dF(k_{peak})$ of <1 cent whereas peaks from real program material will have a $dF(k_{peak})$ of 5 cents or more (1 cent is 1/100 of a semitone), which emphasizes why $dF(k_{peak})$ is an excellent feature for classifying peaks into feedback or program material groups.

If the peak trajectory is determined to be a feedback peak, then the frequency of the respective peak may be determined to be a candidate frequency and may be transmitted to block 420, as described below.

It should be noted that each of the processes in blocks 416 and 418 may include a series of routines or sub-processes. Further, the path 402 may be referred to as an implementation process. Once the notch filter parameters are determined (e.g., blocks 412-418 along path 403), the implementation process (e.g., blocks 420-424) may test candidate frequencies received from block 418 by applying a corresponding notch filter at the candidate frequency to the digital signal.

At block 420, the processor 106 may receive the candidate frequencies and assign a state machine subroutine to each candidate frequency. The processor 106 may assign the candidate frequencies based on a control scheme that runs the state matching subroutines in succession from zero to the last state machine routine. There may be N number of machines for N number of notch filters wherein one state machine may control one notch filter. For each candidate frequency, the assignment process 420 searches all state machine routines (blocks 422). If the candidate frequency is close to a frequency that has already been assigned to a state machine (e.g., is already in use), the candidate frequency is assigned to that same state machine routine. In this case, the notch filter frequency associated with the state machine may be adjusted to the average of its current frequency and the new frequency. In addition the gain of its notch filter may be adjusted by a nominal amount (typically −3 to −6 dB) up to a maximum attenuation (typically −18 dB) and the bandwidth may be increased by an amount proportional to the difference between the state machines current notch frequency and the new candidate frequency so the filter can more easily cover the two feedback peaks. If the candidate frequency is not close to any existing state machine notch frequencies, then the candidate frequency is assigned to the first free state machine routine with a nominal gain (typically −6 dB) and bandwidth (typical Q of 10-120). If there are no free state machines, then the oldest state machine (i.e., the state machine that was assigned a frequency earlier than any of the others) is used and the new candidate frequency is assigned to it with a nominal gain (typically −6 dB) and bandwidth (typical Q of 10-120).

At block 424, the filter parameters frequency, gain and bandwidth (or Q-value) are converted into filter coefficients using a standard notch filter design, where each notch filter is implemented with a single biquadic filter, or biquad.

At blocks 426, the processor 106 applies the notch filters using the generated filter coefficients from block 424. That is, the notch filter is applied at the estimated frequency from block 414, or in the case where one state machine shares multiple candidate frequencies, the notch filter is applied at a frequency derived from the individual candidate frequencies derived in block 414.

At block 428, the processor 106 transmits the filtered digital samples to the DAC 108 for conversion back to the analog domain (e.g., analog electrical signals). The process 400 may end. The resultant analog electrical signals may ultimately be passed to the amplifier 110 and the loudspeaker 112 for reproduction.

Figure 5:
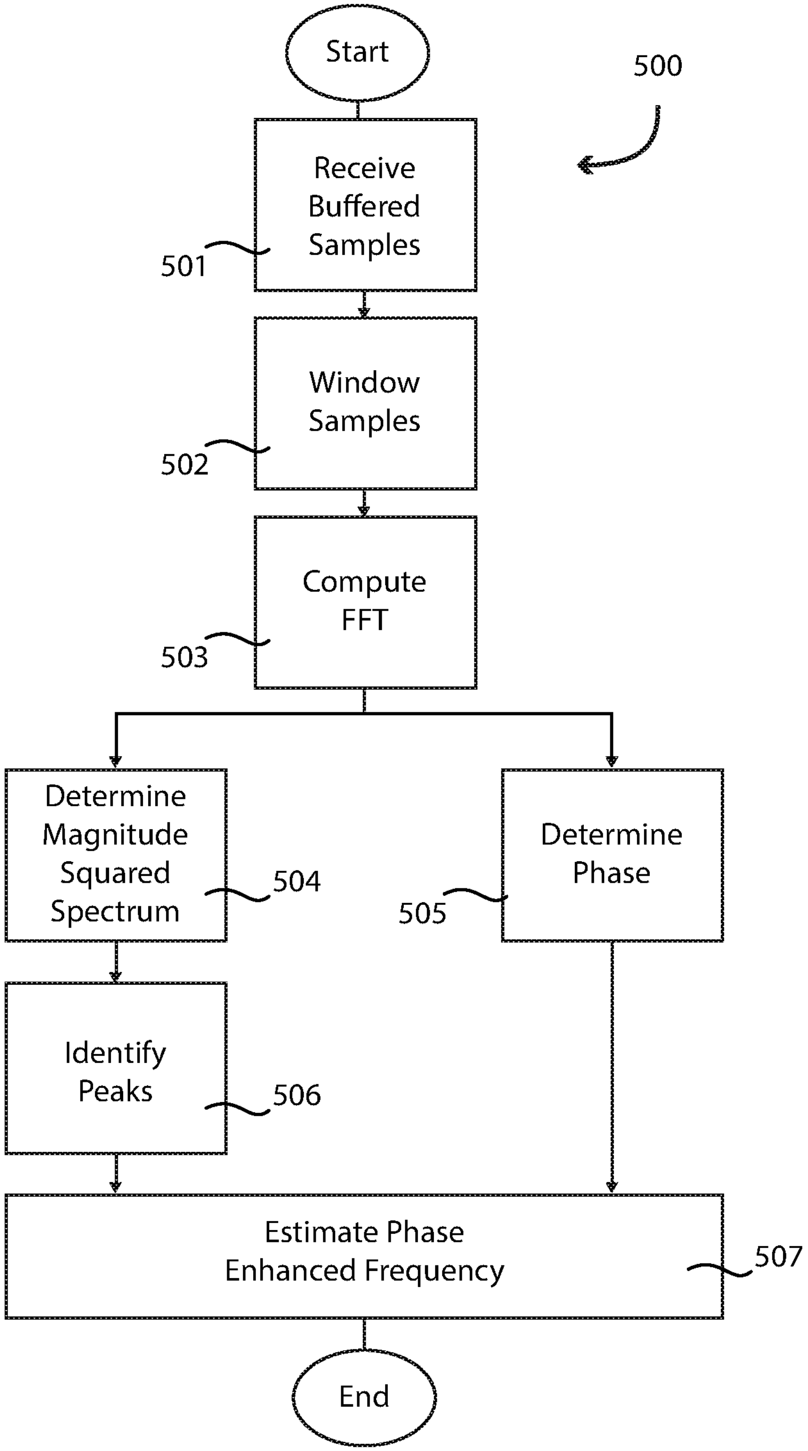
FIG. 5 is a process flow diagram for performing a spectral peak analysis.

FIG. 5 is a process 500 for executing the spectral peak analysis of block 414 in FIG. 4. The process may begin at block 501 where the buffered digital samples may be received (e.g., from block 412). At block 502 the buffered digital samples may be windowed by a spectral analysis window, such as a Hann window, or Hamming window. Other window functions may also be applied to the digital samples.

At block 503, the processor 106 may compute the discrete Fourier transform using a Fast Fourier Transform (FFT) to obtain a complex spectrum Sh(w) based on the window function generated in block 502. While FFTs are discussed herein, other methods for computing a Fourier transform such as a Discrete Fourier Transform (DFT), may also be used.

At block 504, the processor 106 may determine the squared magnitude spectrum. The squared magnitude spectrum may be represented by:

$$M^2 = Sh(w)\cdot Sh^*(w) \quad \text{Eq. 2}$$

At block 505, the phase may be determined by:

$$\pi(w) = \arg(Sh(w)) = \tan^{-1}\left[\frac{Im(Sh(w))}{\mathrm{Re}(Sh(w))}\right] \quad \text{Eq. 3}$$

At block 506, the processor 106 may identify the peaks of the magnitude spectrum. Peaks are identified as bins $k_{peak}$ such that $M^2(k_{peak}-1) \leq M^2(k_{peak}) > M^2(k_{peak}+1)$, where typically the N largest peaks are kept, with N typically equal to 6-12, although other values of N may be used.

At block 507, the processor 106 may estimate the frequencies of each identified peak. This frequency estimation may be accomplished by using the computed phase to achieve a more accurate frequency estimation. In one example, the phase in a peak bin in the current frame may be compared to a past frame. The rate of change of the phase may be used to determine the frequency estimate. However, this method may require a second FFT to be computed a short time before the current frame since the past frame must be relatively close in time (i.e., much smaller than the typical analysis time between peak analysis in the feedback suppression system.) In another example, frequency reassignment may be used which allows for a faster approximation and requires only one FFT to be calculated. This process is described in greater detail in FIG. 6.

Once the peak frequencies are estimated, the processor 106 may then provide the estimated peak frequency to block 416 of FIG. 4 and the process 500 may end.

Figure 6:
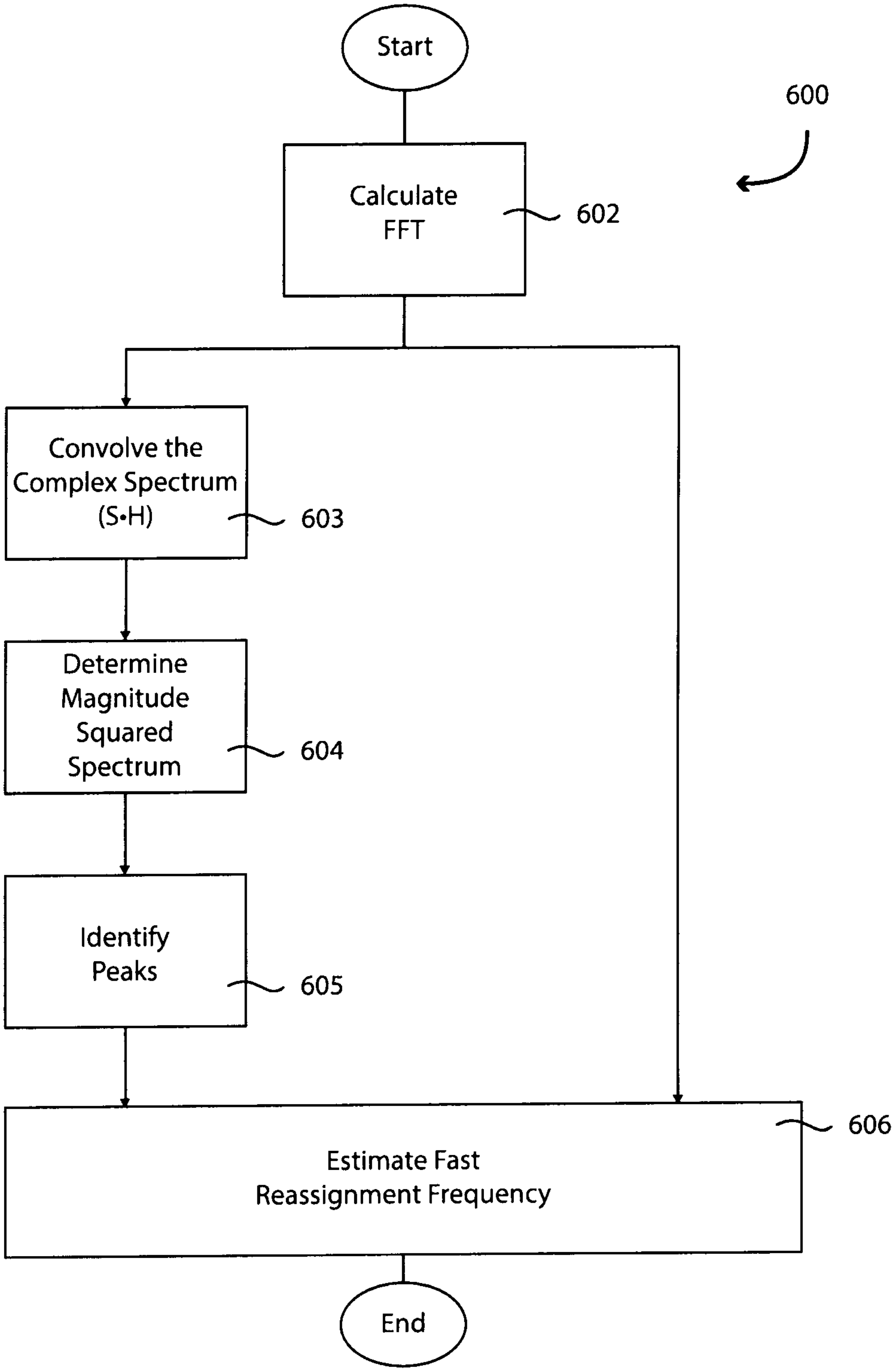
FIG. 6 is another process flow diagram for performing a spectral peak analysis.

FIG. 6 is another process for the spectral peak analysis of block 414 in FIG. 4. FIG. 6 may show the use of frequency reassignment to accomplish the spectral peak analysis.

At block 602, the processor 106 may calculate an FFT resulting in the complex spectrum S(w), similar to block 502 above. Unlike process 500, process 600 does not window the digital signals first. That is, the FFT is performed on the unwindowed digital samples.

At block 603, the processor 106 convolves the complex spectrum S(w) with the Fourier transform of the Hann window H to obtain the complex Hann window spectrum Sh(w)=S*H(w).

At block 604, the processor 106 may determine the squared magnitude spectrum. The squared magnitude spectrum may be represented by:

$$M^2 = Sh(w)\cdot Sh^*(w) \quad \text{Eq. 4}$$

At block 605, the phase may be determined by:

$$\pi(w) = \arg(Sh(w)) = \tan^{-1}\left[\frac{Im(Sh(w))}{\mathrm{Re}(Sh(w))}\right] \quad \text{Eq. 5}$$

At block 605, the processor 106 may identify the peaks of the magnitude spectrum, whereas before, peaks are identified as bins $k_{peak}$ such that $M^2(k_{peak}-1) \leq M^2(k_{peak}) > M^2(k_{peak}+1)$, where typically the N largest peaks are kept, with N typically equal to 6-12, although other values of N may be used.

At block 606, the processor 106 may estimate the frequencies of each identified peak. This frequency estimation may be accomplished by using the reassigned frequency of each peak bin to achieve a more accurate frequency estimation. Because process 600 implements fast frequency reassignment, only one FFT is calculated and there is no need to compute the phase directly, thus avoiding the computation of the inverse tan function.

Other conventional methods of estimating the frequency of a peak may involve simply using the frequency of the spectral bin where the peak is located. In some cases, the two adjacent bins are also used and parabolic interpolation is used to obtain a more accurate peak frequency (i.e., an inverted parabola is fit through the 3 points and the peak of the inverted parabola is used as the center). The accuracy of these methods are limited by the resolution of the FFT bins. During spectral analysis, the higher the resolution in the frequency domain, the lower the resolution in the time domain. Because of this, in short time Fourier transform (STFT) spectral analysis, if better frequency resolution is desired, the analysis window must be very wide in the time domain, losing any information on the location of events in the window and smearing any time varying events. On the other hand, making a window narrower in the time domain causes the window to be wider in the frequency domain, creating poor frequency resolution. Accordingly, in a standard spectrogram image which plots magnitudes of the FFT spectrum as columns for each time instance that the FFT is computed, a tradeoff can be seen as time events become smeared when the window size is wide and frequency events become smeared when the window size is narrow.

Alternatively, a more accurate estimate of a standard short-time Fourier transform (STFT) spectrogram analysis may be accomplished by assigning the energy of an FFT bin to a center of gravity of the energy contributions rather than the center of the window. Reassignment of frequency may be computed using the following equation.

$$\hat{\omega}(t,\omega) = \omega + \mathrm{Im}\left\{\frac{S_{dh}(t,\omega)\cdot S_h^*(t,w)}{|S_h(t,\omega)|^2}\right\} \quad \text{Eq. 6}$$

where ω is the bin frequency, $\hat{\omega}(t, \omega)$ is the reassigned frequency, $S_h(t, \omega)$ is the complex spectrum of a signal s(t) windowed by a window function h(t), and $S_{dh}(t, \omega)$ is the complex spectrum of a signal s(t) windowed by a window function dh(t), where dh(t) is the time derivative of h(t).

A Hann window may be defined as:

$$h(n)=0.5+0.5\cos(2\pi n/N) \text{ for } -N/2<n\le N/2, 0 \text{ otherwise} \quad \text{Eq.7}$$

Using Euler's equation:

$$h(n) = 0.5 + 0.25\left(e^{\frac{2\pi n}{N}} + e^{-\frac{2\pi n}{N}}\right) \quad \text{Eq. 8}$$

H(k) may represent the FFT coefficients of h(n) for frequency bin k. Because the Fourier basis functions are orthogonal, it may be understood that h(n) has three non-zero Fourier transform coefficients H(−1)=0.25, H(0)=0.5 and H(1)=0.25.

Based on the Fourier Convolution Theorem, multiplication in the time domain equates convolution in the frequency domain. Thus:

$$S_h=S*H \quad \text{Eq.9}$$

where S is the unwindowed Fourier transform of s(t). For a single bin k in the FFT, we have:

$$S_h(k)=0.25S(k-1)+0.5S(k)+0.25S(k+1) \quad \text{Eq.10}$$

Differentiating the Hann window of equation 7 with respect to time results in dh(n):

$$dh(n) = \frac{\pi}{N}\sin\left(\frac{2\pi n}{N}\right) \quad \text{Eq. 11}$$

Using Euler's equation:

$$dh(n) = \frac{\pi}{2Nj}\left(e^{\frac{2\pi n}{N}} - e^{-\frac{2\pi n}{N}}\right) \quad \text{Eq. 12}$$

As shown in the above equation, two Fourier coefficients exist DH(−1)=−π/2Nj, and DH(1)=π/2Nj. Thus, for a single bin k of an FFT:

$$S_{dh}(k) = \frac{\pi}{2Nj}(-S(k-1)+S(k+1)) \quad \text{Eq. 13}$$

The fast frequency reassignment may be determined by substituting equation 13 into equation 6, where the reassigned frequency for a bin k of an FFT is:

$$\hat{\omega}(k) = \omega(k) + \frac{\pi}{2N}\mathrm{Im}\left\{\frac{(S(k+1)-S(k-1))\cdot S_h^*(k)}{j|S_h(k)|^2}\right\} \quad \text{Eq. 14}$$

where ω(k)=2π*k/N. Since $S_h(k)$ can be computed using equation 10, it is shown that the fast frequency reassignment shown in equation 14 may be computed from a single unwindowed FFT spectrum S. Equation 14 may be computed from a single FFT and simple convolutions. This, unlike a typical frequency reassignment that requires at least two FFT computations, is a simpler and faster method. Although both methods may have near equivalent accuracy, fast frequency reassignment is significantly faster computationally due at least in part on the lack of the additional FFT computation. Once the peak frequency is estimated, the processor 106 may then provide the estimated peak frequency to block 416 of FIG. 4 and the process 500 may end.

Figure 7:
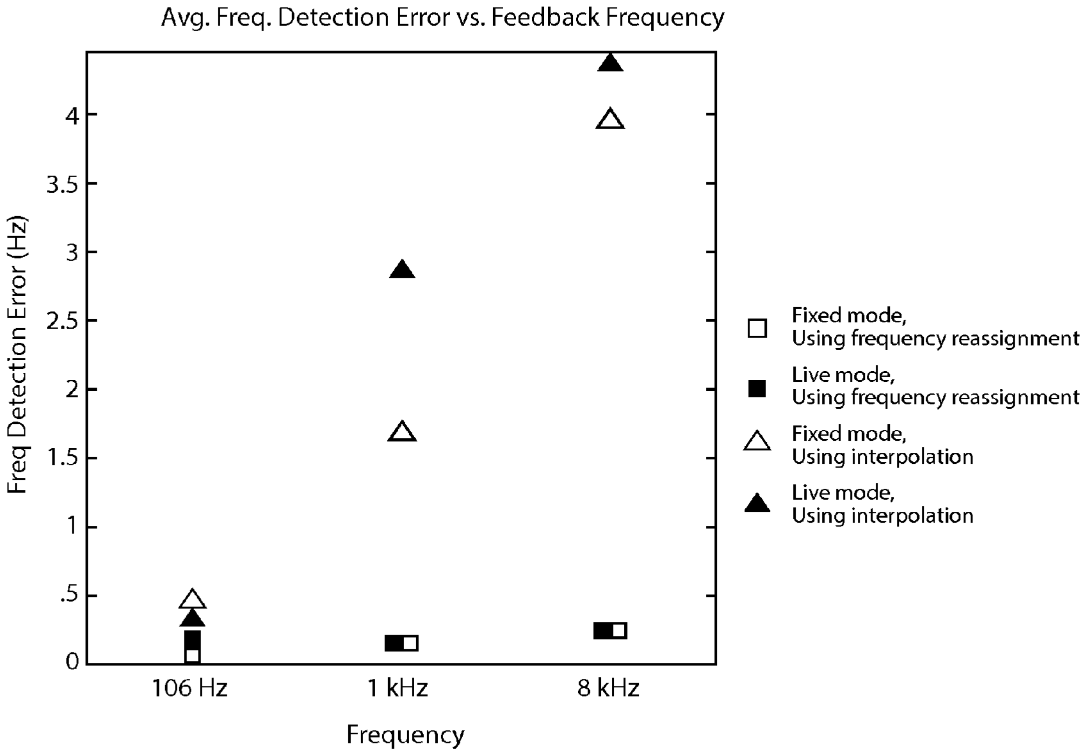
FIG. 7 is a chart illustrating an average frequency detection error for sinusoids at varying frequencies.

FIG. 7 is a chart illustrating an average frequency detection error for sinusoids at varying frequencies using frequency reassignment and parabolic peak interpolation. The chart shows two modes of operation (music high fixed and music high live.) The fixed mode may be used for testing of the system prior to use. For example, the fixed mode may be implemented prior to a concert, or during the testing phase of set up. The live mode may be implemented during the convert to dynamically change the filter parameters e.g., during the concert. Looking at both modes, the chart indicates that there is less error when frequency reassignment is used for peak detection than when parabolic peak interpolation is used. For example, at 1 kHz, the error in both the fixed mode and live mode are significantly lower when frequency reassignment is used as opposed to interpolation. The same is true at 106 Hz and 8 kHz, as shown in the chart.

Figure 8:
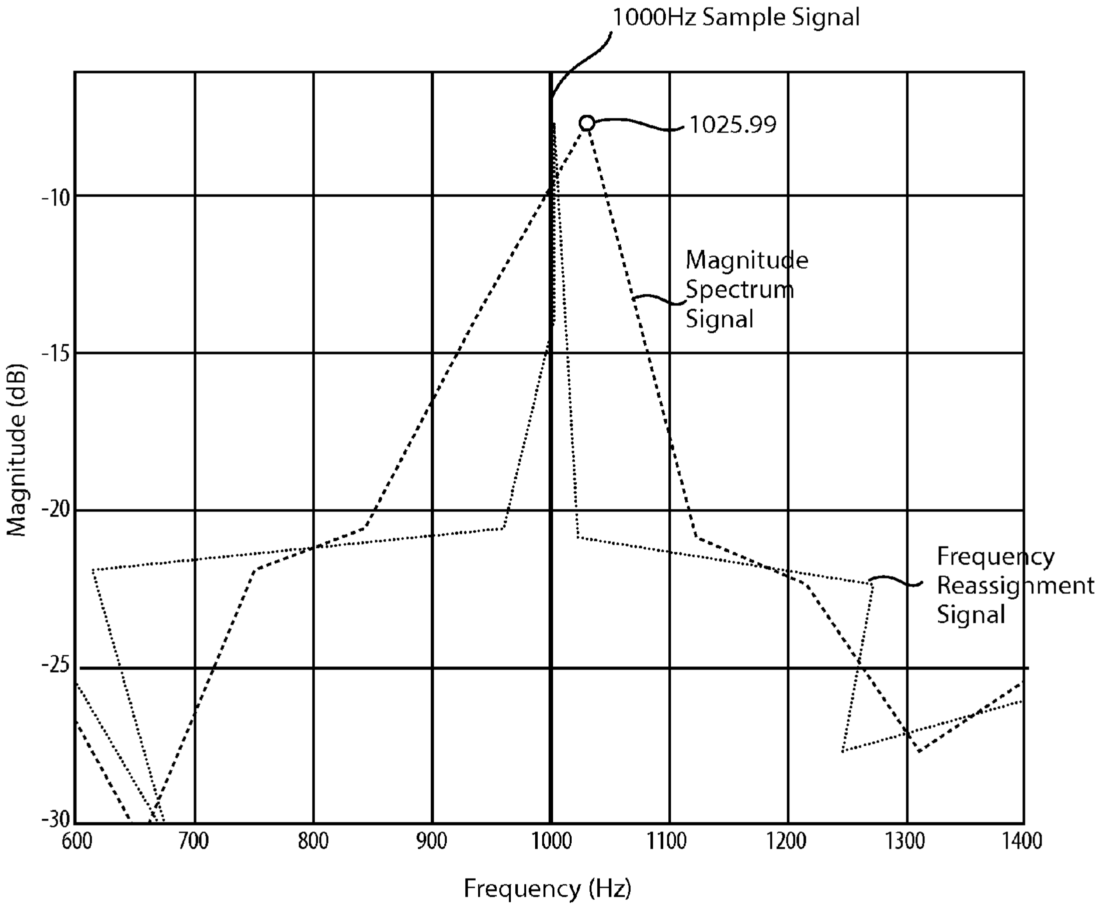
FIG. 8 is a chart of a sinusoid frequency in the presence of noise.

FIG. 8 is a chart of a frequency of a sinusoid in the presence of noise. The chart shows the magnitude spectrum at varying frequencies. A 48 kHz sample signal was generated at 1000 Hz, as indicated on the chart. Using parabolic interpolation, the sample signal is interpolated using a 512 point Hann windowed magnitude spectrum giving an estimated frequency of 1025.99 Hz (error of 25.99 HZ or 0.026%). Using fast frequency reassignment, the frequency is estimated as 1002.27 results (an error of 2.27 Hz or 0.0027%). Thus, fast frequency reassignment yields a more accurate value of estimated frequencies by a factor of 10.

Figure 9:
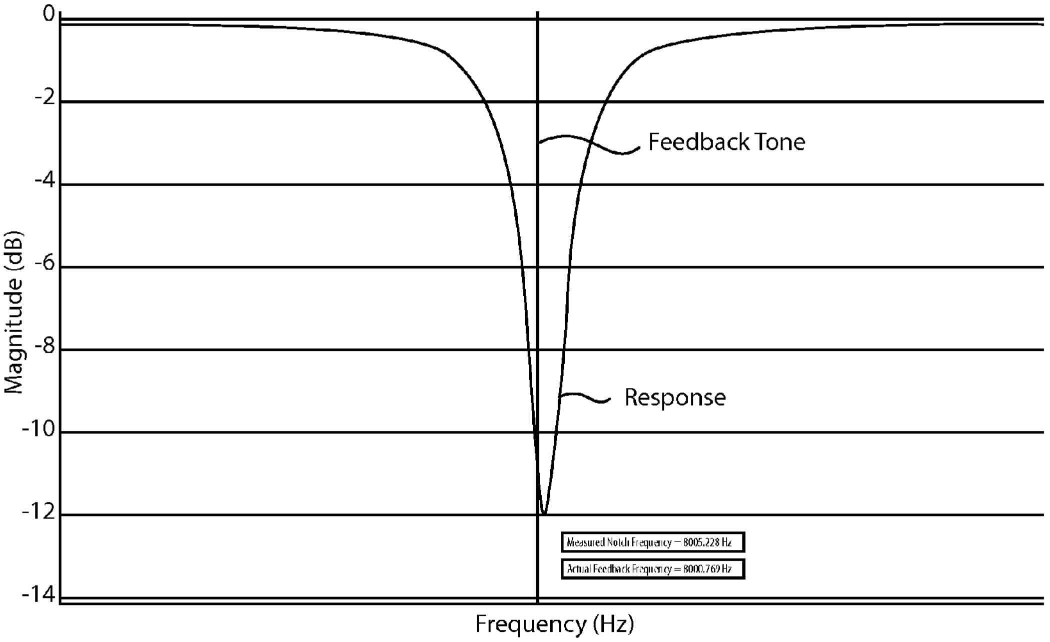
FIG. 9 is a chart illustrating the response of a filter using parabolic interpolation.

FIG. 9 is a chart illustrating the response of a filter where the frequency of the feedback was estimated using parabolic interpolation. The response shows that the notch filter frequency (or estimated frequency) is slightly off (approximately a 5 Hz error) from the actual frequency.

Figure 10:
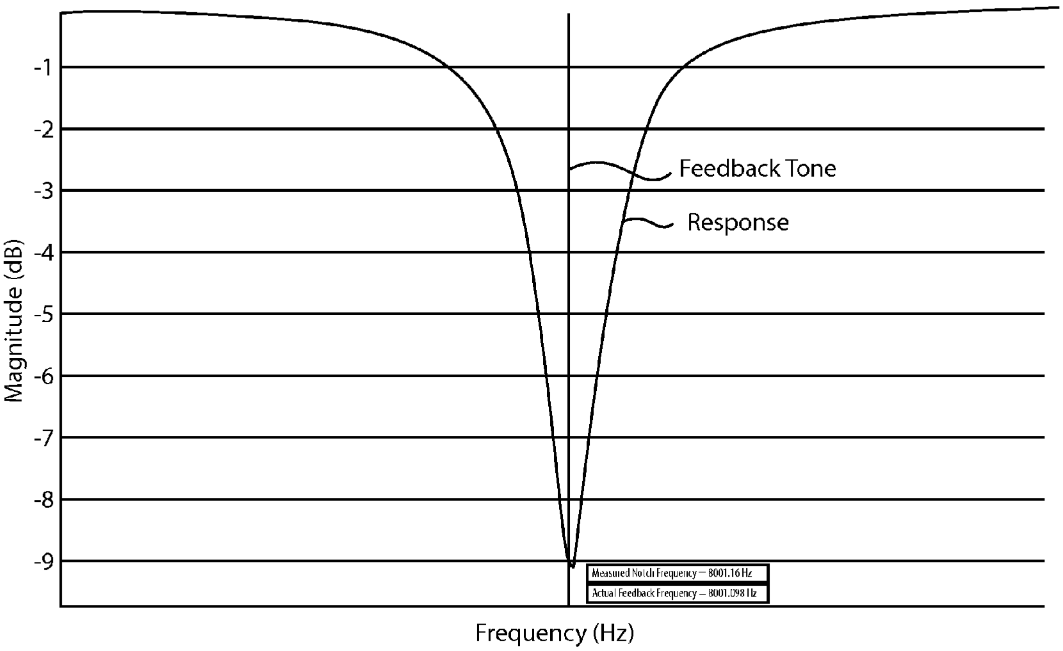
FIG. 10 is a chart illustrating the response of a filter using frequency reassignment.

FIG. 10 is a chart illustrating the response of a filter where the frequency of the feedback was estimated using fast frequency reassignment. The response shows that the notch filter frequency (or estimated frequency) is approximately 0.062 Hz off from the actual frequency, yielding a much lower error than the interpolation method.

As explained, the processor 106 may be a computing device or within a computing device. The processor 106 may include a controller including computer-executable instructions, where the instructions may be executable by one or more computing devices. Computer-executable instructions may be compiled or interpreted from computer programs created using a variety of programming languages and/or technologies, including, without limitation, and either alone or in combination, Java™, C, C++, Visual Basic, Java Script, Perl, Matlab Simulink, TargetLink, etc. In general, a processor 106 (or a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, EEPROM (Electrically Erasable Programmable Read-Only Memory and is a type of non-volatile memory used in computers and other electronic devices to store small amounts of data that must be saved when power is removed, e.g., calibration tables or device configuration.) optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

While embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A feedback suppression system for reducing acoustic feedback, comprising:
- a controller configured to:
- buffer a series of incoming digital sample signals to provide a plurality of buffered signals, the incoming digital sample signal being indicative of an audio input signal that includes audio data and acoustic feedback;
- determine a complex spectrum of the plurality of buffered signals;
- determine a magnitude squared spectrum from the complex spectrum;
- identify at least one peak in the magnitude squared spectrum;
- identify a frequency of the at least one identified peak using a phase enhanced frequency estimate; and
- set a notch filter at the identified frequency to eliminate the acoustic feedback of the audio input signal.

2. The system of claim 1, wherein the phase enhanced frequency estimate is a Fast Frequency Reassignment of the complex spectrum of the buffered signals.

3. The system of claim 1, wherein the phase enhanced frequency estimate is determined using a single unwindowed FFT transform spectrum.

4. The system of claim 3, where two complex window spectra are used having 3 and 2 non-zero coefficients.

5. The system of claim 1, wherein the at least one candidate feedback peak is identified based on a frequency deviation of the at least one peak, the frequency deviation being determined based at least in part on the phase enhanced frequency estimate.

6. The system of claim 5, wherein the frequency deviation is derived from previously classified peaks.

7. The system of claim 5, wherein the frequency deviation is derived from fast frequency reassignment.

8. The system of claim 1, wherein the phase enhanced frequency estimate is determined using a Hann window to define three non-zero transform coefficients.

9. The system of claim 1, wherein the phase enhanced frequency estimate is determined using a center of gravity of energy of the complex spectrum.

10. A feedback suppression system for reducing acoustic feedback, comprising:
- a controller configured to:
- receive a series of incoming digital sample signals;
- determine a complex spectrum of the incoming digital sample signals;
- determine a magnitude squared spectrum from the complex spectrum of the incoming digital sample signals;

identify at least one peak in the magnitude squared spectrum;

identify a frequency of the at least one identified peak using a phase enhanced frequency estimate; and set a notch filter at the identified frequency to eliminate acoustic feedback of the incoming digital sample signals.

11. The system of claim 10, wherein the phase enhanced frequency estimate is a Fast Frequency Reassignment of the complex spectrum of the incoming digital sample signals.

12. The system of claim 10, wherein the phase enhanced frequency estimate is determined using a single unwindowed FFT transform spectrum.

13. The system of claim 10, wherein the at least one peak is identified based on a frequency deviation of the at least one peak, the frequency deviation being determined based at least in part on the phase enhanced frequency estimate.

14. The system of claim 13, wherein the frequency deviation is derived from previously classified peaks.

15. A feedback suppression system for reducing acoustic feedback, comprising:

a controller configured to:

buffer a series of incoming audio input signals to provide a plurality of buffered signals, determine a complex spectrum of the plurality of buffered signals;

determine a magnitude squared spectrum from the complex spectrum;

identify at least one peak in the magnitude squared spectrum;

identify a frequency of the at least one identified peak using a phase enhanced frequency estimate; and set a notch filter at the identified frequency to eliminate acoustic feedback of the audio input signal.

16. The system of claim 15, wherein the phase enhanced frequency estimate is a Fast Frequency Reassignment of the complex spectrum of the buffered signals.

17. The system of claim 15, wherein the phase enhanced frequency estimate is determined using a single unwindowed FFT transform spectrum.

18. The system of claim 15, wherein the phase enhanced frequency estimate is determined using a complex convolution with a plurality of complex window spectra.

19. The system of claim 15, wherein the at least one peak is identified based on a frequency deviation of the at least one peak, the frequency deviation being derived from previously classified peaks.

20. The system of claim 19, wherein the frequency deviation is derived from fast frequency reassignment.

* * * * *